(12) United States Patent
Choi

(10) Patent No.: US 7,424,508 B2
(45) Date of Patent: Sep. 9, 2008

(54) SELF-TIMED CARRY LOOK-AHEAD ADDER AND SUMMATION METHOD THEREOF

(75) Inventor: Chang-Jun Choi, Suwon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 727 days.

(21) Appl. No.: 10/781,824

(22) Filed: Feb. 20, 2004

(65) Prior Publication Data

US 2004/0167957 A1 Aug. 26, 2004

(30) Foreign Application Priority Data

Feb. 22, 2003 (KR) ............ 10-2003-0011210

(51) Int. Cl.
*G06F 7/50* (2006.01)
(52) U.S. Cl. .................. 708/712; 708/714
(58) Field of Classification Search .......... 708/712, 708/714
See application file for complete search history.

(56) References Cited

U.S. PATENT DOCUMENTS

| | | | | |
|---|---|---|---|---|
| 5,136,539 A | * | 8/1992 | Kumar | 708/712 |
| 5,487,025 A | * | 1/1996 | Partovi et al. | 708/714 |
| 5,508,952 A | | 4/1996 | Kantabutra | |
| 6,012,079 A | * | 1/2000 | Song | 708/714 |
| 6,742,014 B2 | * | 5/2004 | Bradley | 708/710 |
| 6,839,729 B2 | * | 1/2005 | Pham | 708/710 |
| 2002/0143841 A1 | * | 10/2002 | Farooqui et al. | 708/710 |

FOREIGN PATENT DOCUMENTS

JP 1993-61643 3/1993

\* cited by examiner

*Primary Examiner*—Tan V. Mai
(74) *Attorney, Agent, or Firm*—Harness, Dickey & Pierce, P.L.C.

(57) ABSTRACT

A carry look-ahead adder may include: a carry generation circuit to generate carry propagation bit values and carry kill bit values for M blocks based on an N-bit addend and augend; a block carry circuit to generate block carry signals based upon the bit values; a Manchester-carry-chain configured bit carry circuit to generate first bit carry signals where a block carry exists in each of the M blocks and second carry bit signals where no block carry exists, based on the bit values; a control circuit to generate, independently of a clock enable signal at a logical level, selection-control signals based upon the block carry signals; and a summation selection circuit to select between the first bit carry signals and the second bit carry signals and to add the carry propagation bit values and the selected carry signals.

24 Claims, 9 Drawing Sheets

SELF-TIMED CARRY LOOK-AHEAD ADDER AND SUMMATION METHOD THEREOF

CROSS-REFERENCE TO RELATED APPLICATION

This application claims the priority of Korean Patent Application No. 2003-11210, filed on Feb. 22, 2003, in the Korean Intellectual Property Office, the disclosure of which is incorporated herein in its entirety by reference.

BACKGROUND OF THE INVENTION

Delay of general adders is determined by carry propagation paths. In order to increase the operating speed of an adder, the carry propagation paths are reduced by using a Background Art carry look-ahead adder (CLA) which includes Manchester carry chains. Such a CLA according to the Background Art that generates carry propagation bits and carry generation bits for two operators with binary values to be summed, e.g., an addend and an augend, and then calculates final summation values from bit carries selected by block carry signals. Such a CLA is disclosed in U.S. Pat. No. 5,508,952 or Japanese Patent Publication No. 1993-61643.

More specifically, the Background Art CLA calculates block carry signals and bit carries using the carry propagation bits and the carry generation bits generated at rising edges of a predetermined clock signal indicating the start of a summation operation, e.g., at those times that the clock signal transitions to an active state. However, instead of calculating the final summation values in one phase within the active period of the clock signal, the Background Art CLA calculates the final summation values from the bit carries when a predetermined enable signal is activated in synchronization with falling edges of the clock signal, e.g., when a sense amplifier flip-flop (F/F) is driven in a next phase in the active period of the clock signal.

Accordingly, the moment when the block carry signals are generated according to the Background Art CLA varies depending on the size of the addend and the augend. Thus, a timing margin (via an enabling clock signal) is introduced before a summation of all bits is performed to accommodate delay associated with large addends and/or augends. In other words, although carries are generated and propagated during the active state of the clock signal after a rising edge, operation of the sense amplifier F/F is delayed until the next phase of the clock signal to accommodate variable sizes of the addends and/or augends.

SUMMARY OF THE INVENTION

Embodiments of the present invention provide a one-phase (or, in other words, single-phase) self-timed CLA (again, carry look-ahead adder and associated method) which can use Manchester carry chains and includes a synchronizer that calculates a final summation value from alternative bit carry signals soon as the block carry signals are generated and propagated, which has an advantage (as contrasted to the Background Art), e.g., of reducing time otherwise lost due to waiting for an enable signal to activate a sense amplifier F/F.

BRIEF DESCRIPTION OF THE DRAWINGS

The above and other features and advantages of the present invention will become more apparent by describing in detail example embodiments thereof with reference to the attached drawings in which.

DETAILED DESCRIPTION OF THE PRESENT INVENTION

Figure 1:
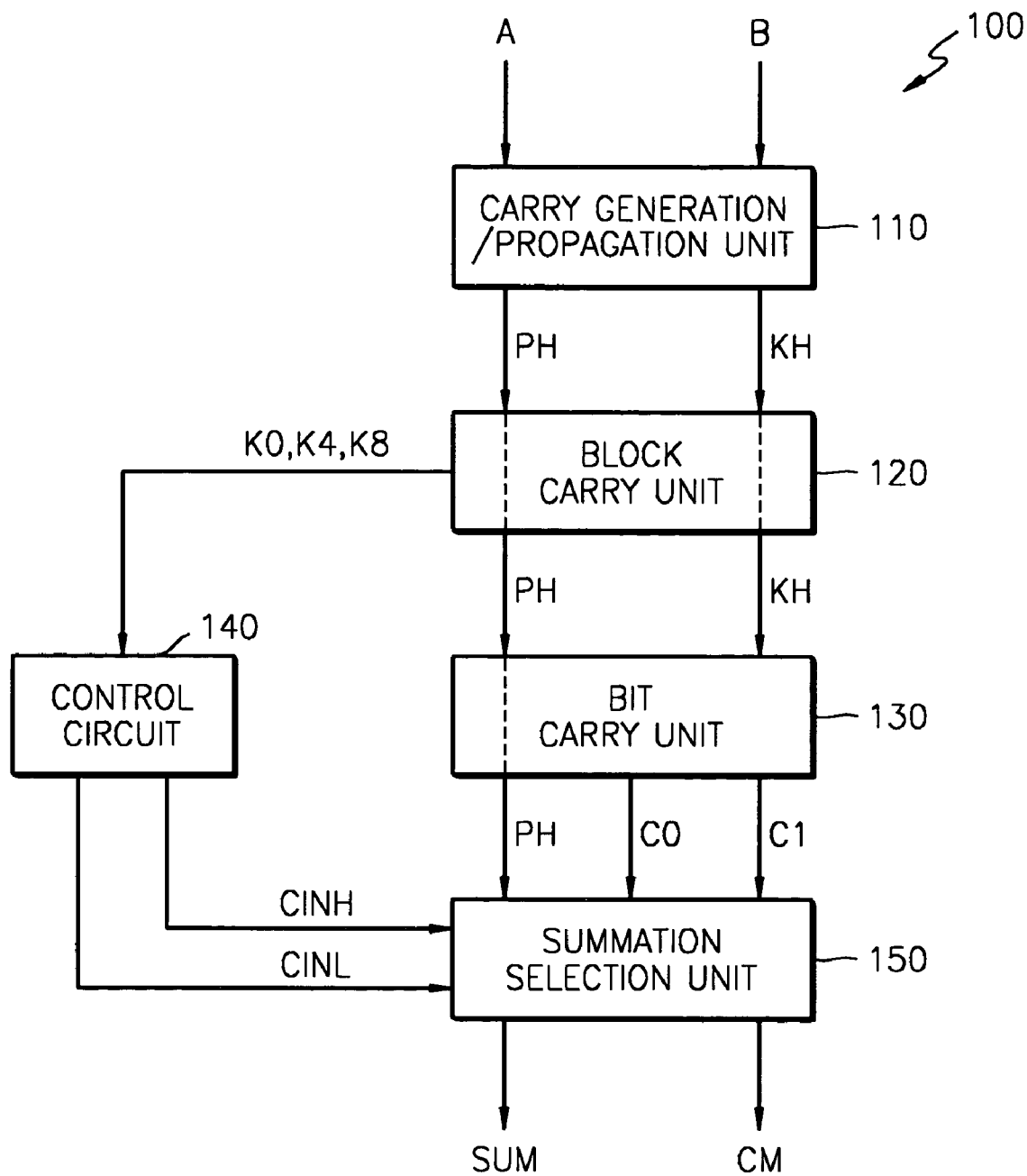
FIG. 1 is a block diagram of a CLA according to an embodiment of the present invention.

The present invention will now be described in detail by explaining embodiments thereof with reference to the attached drawings. Like reference numerals denote like members throughout the drawings.

Figure 2:
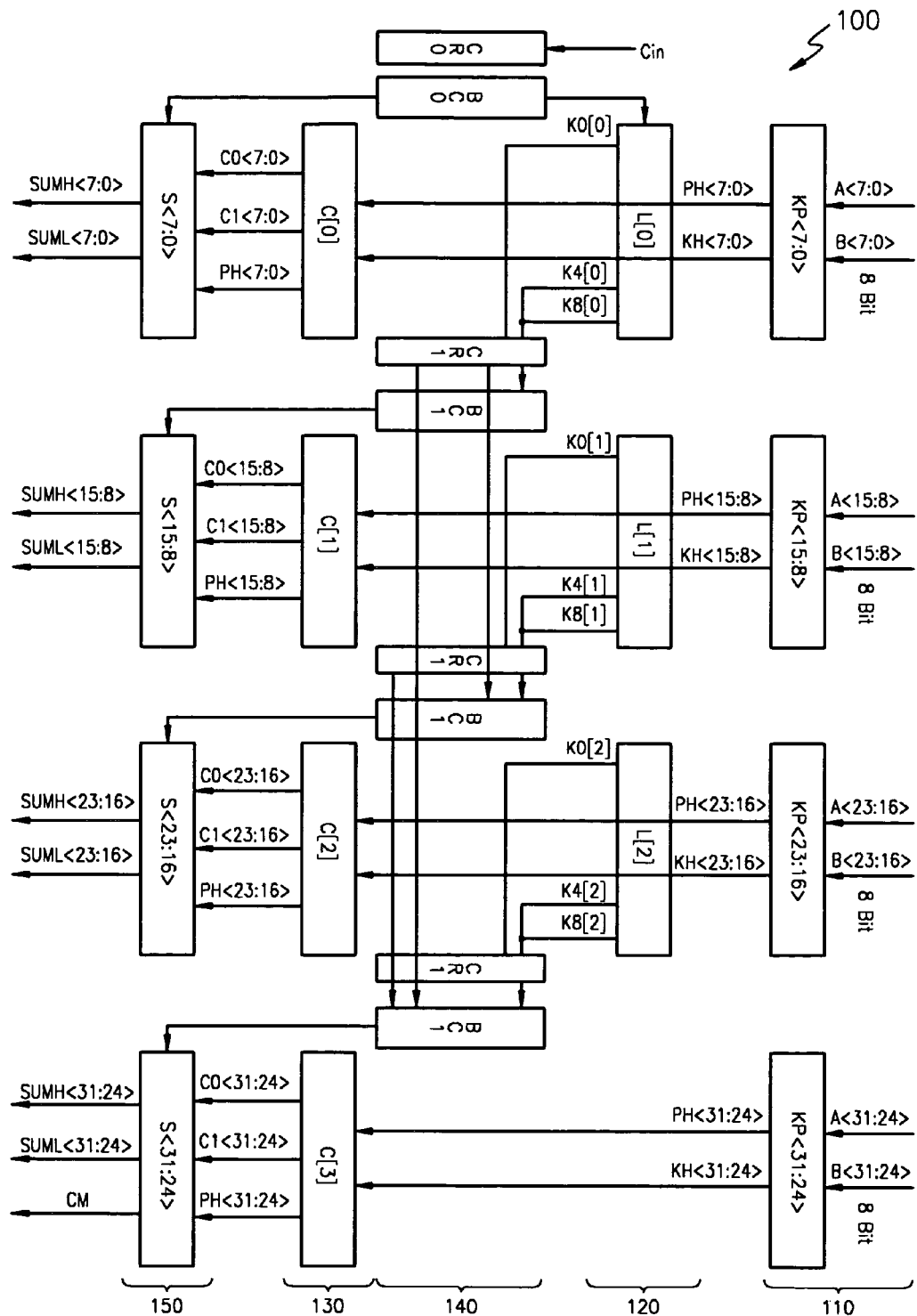
FIG. 2 is a more detailed block diagram of the CLA of FIG. 1, according to an embodiment of the present invention.

FIG. 1 is a block diagram of a CLA (again, carry look-ahead adder) according to an embodiment of the present invention, and FIG. 2 is a more detailed block diagram of the CLA of FIG. 1 (according to another embodiment of the present invention). Referring to FIGS. 1 and 2, a CLA 100 includes a carry generation/propagation unit 110, a block carry unit 120, a bit carry unit 130, a control circuit 140, and a summation selection unit 150.

Carry generation/propagation unit 110 divides both an addend A and an augend B, input as N-bit binary values, into M blocks, performs a first logic combination on each bit in the M blocks of addend A and each bit in the M blocks of augend B, and calculates a carry propagation bit value PH and a carry kill bit value KH for each of the M blocks of both addend A and augend B. Variables N and M are positive integers. In FIG. 2, it is assumed that addend A and augend B are respectively N bits (e.g., N=32) and respectively divided into M blocks (e.g., M=4).

Here, as can be seen below in Table 1, carry generation/propagation unit 110 performs: an XOR operation on every pair of bits of addend A and augend B to calculate carry propagation bit value PH; and an NOR operation on every pair of bits of addend A and augend B to calculate carry kill bit value KH. In Table 1, "0" denotes a first logic state, e.g., a logic low state, "1" denotes a second logic state, e.g., a logic high state, and "i" denotes an $i^{th}$ in each of the M blocks, e.g., the bits from 0 to $\{(N/M)-1\}$, and particularly the bits from 0 to 7 in FIG. 2 (again, given the example of N=32 and M=4).

In the example of FIG. 2, N/(2M) is 4.

TABLE 1

| A<i> | B<i> | PH<i> (XOR) | KH<i> (NOR) |
|---|---|---|---|
| 0 | 0 | 0 | 1 |
| 0 | 1 | 1 | 0 |
| 1 | 0 | 1 | 0 |
| 1 | 1 | 0 | 0 |

Block carry unit 120 generates at least one first-type block carry signal (e.g., K0), at least on second-type block carry signal (e.g., K4) and at least one third-type block carry signal (e.g., K8). Here, block carry K0 is set to the second logic state when one or more of carry kill bit values KH are in the second logic state, according to a second logic combination. Block carry K4 is set to the second logic state when one or more carry kill bit values KH in the second logic state exists in the lower N/(2M) bits (the lower 4 bits in each block of FIG. 2), according to a third logic combination performed on carry propagation bit values PH and carry kill bit values KH. Block carry K8 is set to the second logic state when one or more carry kill bit values KH in the second logic state exist in the upper N(2M) bits (upper 4 bits in each block of FIG. 2), according to a fourth logic combination performed on carry propagation bit values PH and carry kill bit values KH.

The second logic combination is an OR operation performed on all carry kill bit values KH, as shown in Logic Equation 1 below. Also, when one or more carry kill bit values KH are in the second logic state, carries generated by bit carry unit 130 are consumed (or, in other words, e.g., killed), according to the principle of operating the Manchester carry chains.

$$K0=KH<0>+KH<1>+\ldots+KH<6>+KH<N/(2M)> \quad (1)$$

In Equation 1, K0 is the block carry for checking whether a carry kill bit is generated from any of the bits in one block, and KH<i> is the carry kill bit value of the $i^{th}$ bit.

Third logic combination is a logic operation which yields the second logic state when one or more of carry kill bit values KH of the lower N/(2M) bits is in the second logic state along with all of carry propagation bit values PH in lower bit positions. More particularly, if one or more of carry kill bits KH<j> (0≦j<N/2M) is set to the second logic level, and carry propagation bit values PH<{i+1}> through PH<{N−1}> are set to the second logic level, then the third logic combination is set to the second logic state, as shown below in Equation 2.

$$K4=PH<\{(N/M)-1\}>PH<\{(N/M)-2\}>\ldots PH<\{N/(2M)+1\}>PH\ \{KH<\{N/(2M)-1\}>+PH<\{N/(2M)-1\}>KH<\{N/(2M)-2\}>+PH<\{N/(2M)-1\}>PH<\{N/(2M)-2\}>KH<\{N/(2M)-3\}>+\ldots+PH<\{N/(2M)-1\}>PH<\{N/(2M)-2\}>\ldots PH<1>KH<0>+PH<\{N/(2M)-1\}>PH<\{N/(2M)-2\}>\ldots PH<1>PH<0>\} \quad (2)$$

In Equation 2, K4 is the block carry for checking whether kill terms (or, in other words, e.g., one or more carry kill bit values KH in the second logic state) exist in the lower N/(2M) bits, PH<i> is the carry propagation bit value, and KH<i> is the carry kill bit value.

A logic Equation 3 (shown below) can be obtained by the substitution of the example values N=32 and M=4 into Logic Equation 2.

$$K4=PH<7>PH<6>PH<5>PH<4>\{KH<3>+PH<3>KH<2>+PH<3>PH<2>PH<1>KH<0>+PH<3>PH<2>PH<1>PH<0>\} \quad (3)$$

Fourth logic combination is a logic operation which yields the second logic state when one or more of carry kill bit values KH of the upper N/(2M) bits is set to the second logic state along with all of carry propagation bit values PH in higher bit positions. More particularly, if one or more of carry kill bit value KH<j> (N/2M≦j<N) are set to the second logic level, and carry propagation bit values PH<{i+1}> through PH<{N−1}> are all set to the second logic level, then the fourth logic combination is set to the second logic state, as shown below in Equation 4.

$$K8=KH<\{(N/M)-1\}>+PH<\{(N/M)-1\}>KH<\{(N/M)-2\}>+\ldots+PH<\{(N/M)-1\}>PH<\{(N/M)-2\}>\ldots PH<\{(N/(2M)+2)\}>KH<\{N/(2M)+1\}<+PH<\{(N/M)-1\}>PH<\{(N/M)-2\}>\ldots PH<\{(N/(2M)+1)\}>KH<N/(2M)>\ldots \quad (4)$$

In Equation 4, K8 is the block carry for checking whether kill terms occur in the upper N/(2M) bits, e.g., one or more carry kill bits in the second logic state are generated from the upper N/(2M) bits, PH<i> is the carry propagation bit value, and KH<i> is the carry kill bit value.

A logic Equation 5 (shown below) can be obtained by the substitution of the example values N=32 and M=4 into Logic Equation 4.

$$K8=KH<7>+PH<7>KH<6>+PH<7>PH<6>KH<5>+PH<7>PH<6>PH<5>KH<4> \quad (5)$$

When a carry is generated from the first bits of addend A and augend B in each of the M blocks and when no carry is generated in the first bits, bit carry unit 130 generates carries second carry signals C1 and first carry signals C0, respectively, using the Manchester carry chains by performing a fifth logic combination on carry propagation bit values PH and carry kill bit values KH. The most significant bits (MSBs) of addend A and augend B in each block are the first bits. In other words, a block carry exists when a carry is generated from the first bits in each of the M blocks.

For example, in FIG. 2, when the sum of addend A and augend B in each of the 4 blocks is higher than "1111", a block carry exists in the block. The Manchester carry chains are: circuits which kill generated carries when one or more of carry kill bit values KH applied to the Manchester carry chains are in the second logic state; and known to the ordinarily skilled artisan, e.g., U.S. Pat. No. 5,508,952 or Japanese Patent Publication No. 1993-61643.

Bit carry unit 130 performs a fifth logic combination, which satisfies Logic Equation 6 (shown below). In Equation 6, C1<i> corresponds to the case where the block carry exists, and C0<i> corresponds to the case where no block carry exists.

$$C0<i>=KH<i-1>+PH<i-1>C0<i-1>$$

$$C1<i>=KH<i-1>+PH<i-1>C1<i-1> \quad (6)$$

In Equation 6, i denotes integers from 0 to (N/M−1), C1<i> denotes a carry for an $i^{th}$ bit in a block in which the block carry exists, C0<i> denotes a carry for an $i^{th}$ bit in a block in which no block carry exists, PH<i> denotes the carry propagation bit value of the $i^{th}$ bit, and KH< > denotes the carry kill bit value of the $i^{th}$ bit.

Control circuit 140 is a synchronizer (or, in other words, a kind of timing controller) that generates selection-control signals CINH and CINL which are logical compliments of each other and are set to the first or second logic states, respectively, according to logic that operates on block carry signals K0, K4, and K8 and a carry value propagated from lower bit blocks in each of the M blocks. The outputs of control circuit 140 are independent of any clock signals.

Here, selection-control signals CINH and CINL are logical compliments of (or, in other words are logically) inverted and are generated so that summation selection unit 150 selects bit carry signals C1 when block carry signals K0, K4, and K8 are in the first logic state. Selection-control signals CINH and CINL may also be generated so that summation selection unit 150 selects bit carry signals C1 when the lower bit block propagate carries.

As shown in FIG. 2, the lower bit blocks (e.g., for bits <23:16> block, etc.) include bits <15:8> block located immediately lower from bits <23:16> block in which the summation is performed and bits <7:0> block located immediately lower from bits <15:8> block. In other words, carry propagation from a lower block may occur in a first previous (again, bits <15:8> block) or second previous (again, bits <7:0> block) lower bit block. Carry propagation from the second previous lower bit block may occur in a case where carries are generated in both the first and second previous lower bit blocks.

Similarly, selection-control signals CINH and CINL may be generated so that summation selection unit 150 selects bit carry signals C0 when one of block carry signals K0, K4, and K8 of each of the M blocks is in the second logic state. Selection-control signals CINH and CINL may also be generated so that summation selection unit 150 selects bit carry signals C0 when there are no carries propagated from the lower bit blocks.

Here, summation selection unit 150 synchronizes with selection-control signals CINH and CINL and then outputs a final sum result signal SUM within a one-phase clock signal as soon as block carry signals K0, K4, and K8 are generated.

In other words, summation selection unit 150 selects bit carry signals C0 or bit carry signals C1 according to selection-control signals CINH and CINL, adds carry propagation bit values PH to the selected bit carry signals, and outputs signal SUM including a final carry signal CM. Here, as can be seen in Table 2 below, the summation is achieved by performing an XOR logic operation on the selected bit carry signals (signals C0 or signals C1) and corresponding carry propagation bit values PH.

TABLE 2

| PH<i> | C0<i> | C1<i> | PH<i> + C0<i> (XOR) | PH<i> + C1<i> (XOR) |
|---|---|---|---|---|
| 0 | 0 | 0 | 0 | 0 |
| 0 | 1 | 1 | 1 | 1 |
| 1 | 0 | 0 | 1 | 1 |
| 1 | 1 | 1 | 0 | 0 |

In Table 2, as in Table 1, "0" denotes the first logic state, and "1" denotes the second logic state, and i denotes an $i^{th}$ bit in the M blocks, e.g., bits from 0 to {(N/M)−1}, particularly bits from 0 to 7.

The operation of CLA 100 will be described in more detail with reference to circuit diagrams shown in FIGS. 3 through 7.

Figure 3:
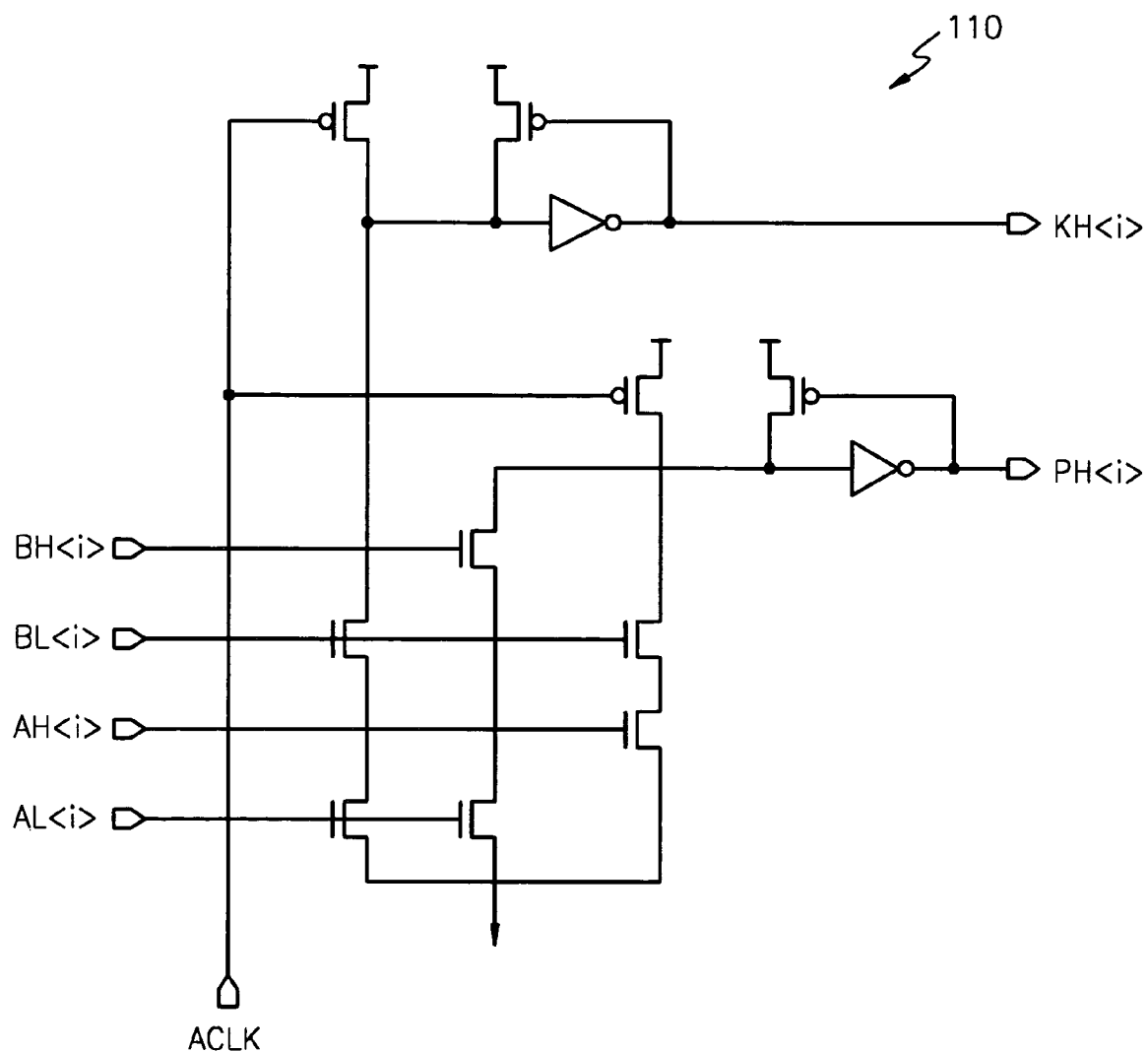
FIG. 3 is a circuit diagram of an example implementation of a carry generation/propagation unit 110 of FIG. 1, according to an embodiment of the present invention.

FIG. 3 is a circuit diagram of an example implementation of carry generation/propagation unit 110 of FIG. 1, according to an embodiment of the present invention. Referring to FIG. 3, carry generation/propagation unit 110 receives addend A and augend B input as N-bit binary values. Next, when a clock signal ACLK signaling the start of the summation is activated, carry generation/propagation unit 110 determines carry propagation bit value PH and carry kill bit value KH. Carry propagation bit value PH for an $i^{th}$ but is determined by performing the first logic combination of Table 1, namely an XOR operation, on each bit of addend A and each bit of augend B. Carry kill bit value KH for an $i^{th}$ bit is determined by performing the second logic combination of Table 1, namely a NOR operation on each bit of addend A and each bit of augend B. In FIG. 3, AL<i> and BL<i> are respectively inverted signals (or, in other words, logical compliments) of bit values AH<i> and BH<i> of addend A and augend B.

Figure 4:
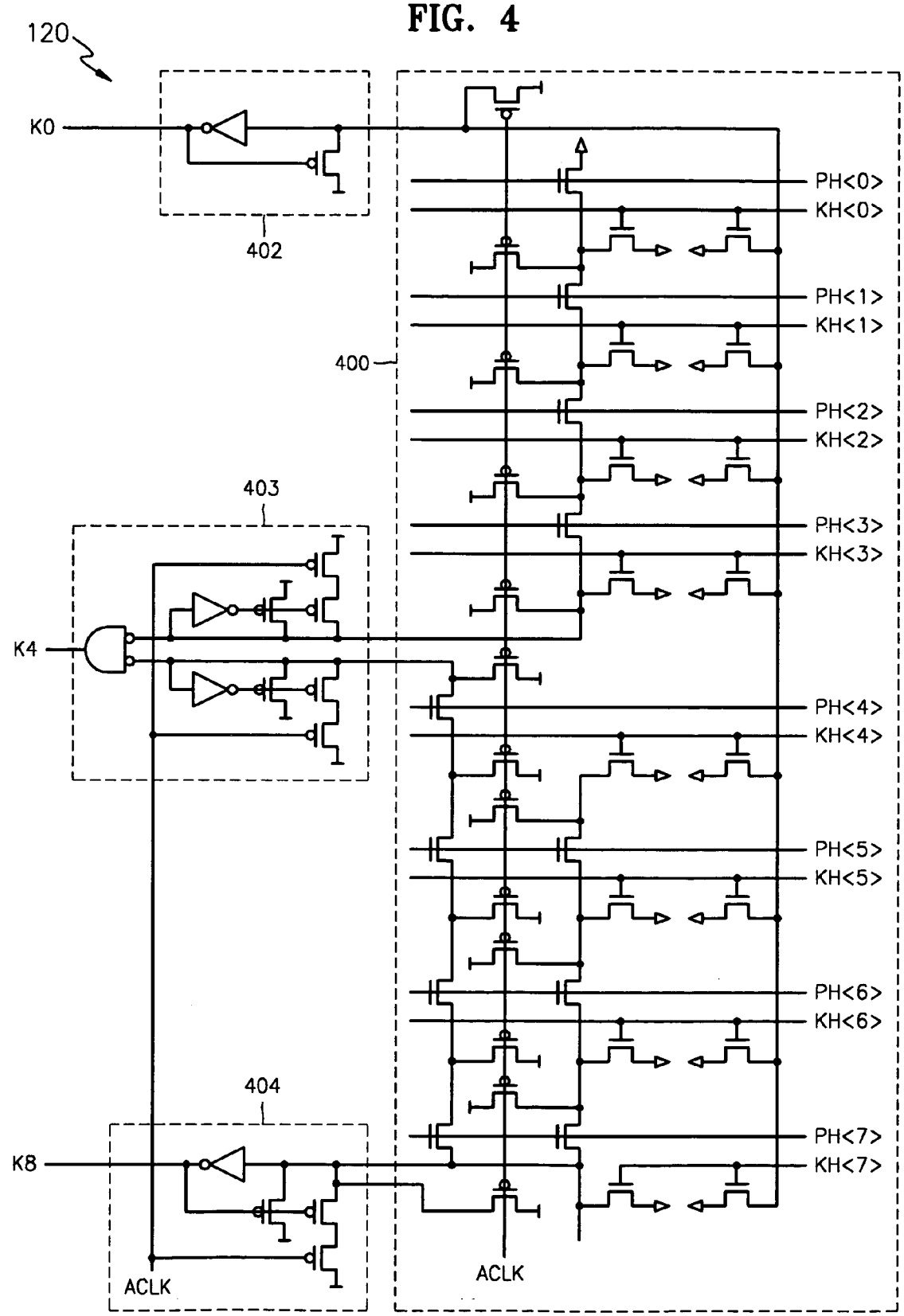
FIG. 4 is a circuit diagram of an example implementation of a block carry unit 120 of FIG. 1, according to an embodiment of the present invention.

FIG. 4 is a circuit diagram of an example implementation of block carry unit 120 of FIG. 1, according to an embodiment of the present invention. In FIG. 4, there is provided a common logic block 400, a second logic block 402, a third logic block 403 and a fourth logic block 404. The second logic combination corresponds to blocks 402 and 400. The third logic combination corresponds to blocks 403 and 400. And the fourth logic combination corresponds to blocks 404 and 400.

When clock signal ACLK signaling the start of the summation is activated, block carry unit 120 receives carry propagation bit values PH and carry kill bit values KH from carry generation/propagation unit 110 and accordingly generates block carry signals K0, K4, and K8.

In FIG. 4, block carry signal K0 transitions to the second logic state when one or more carry kill bit values KH are in the second logic state, according to Equation 1. As such, the second logic combination is performed on carry kill bit values KH. Block carry signal K4 (according to Equation 3) transitions to the second logic state when one or more carry kill bit values KH in the lower N/(2M) bits (lower 4 bits in each block of FIG. 2) are set to the second logic state. As such, the third logic combination is performed on carry propagation bit values PH and carry kill bit values KH. Block carry K8 (according to Equation 5) transitions to the second logic state when one or more carry kill bit values KH in the upper N/(2M) bits (upper 4 bits in each block of FIG. 2) are set to the second logic state. As such, the fourth logic combination is performed on carry propagation bit values PH and carry kill bit values KH.

Figure 5A:
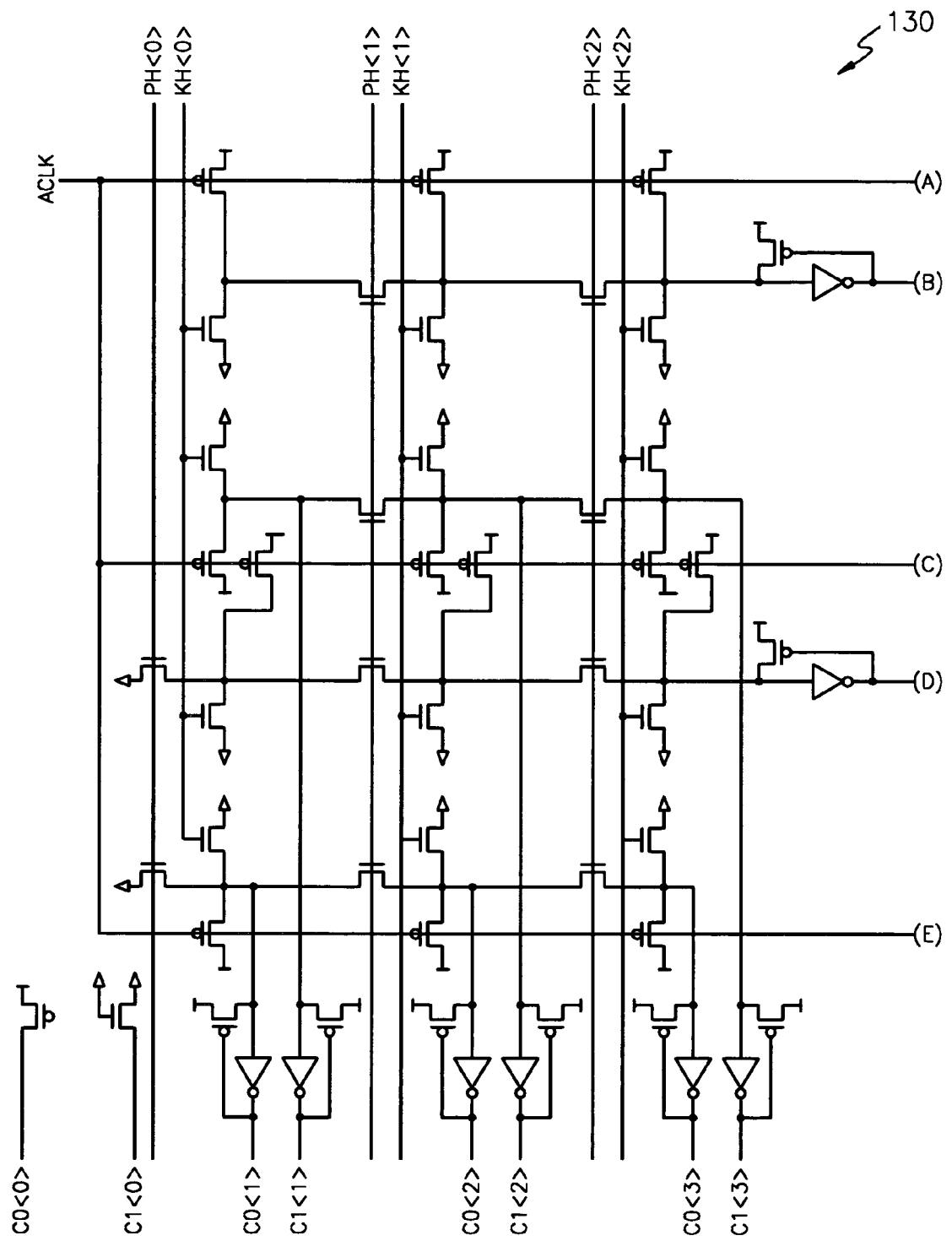
FIGS. 5A and 5B are circuit diagrams of an example implementation of a bit carry unit 130 of FIG. 1, according to an embodiment of the present invention.
Figure 5B:
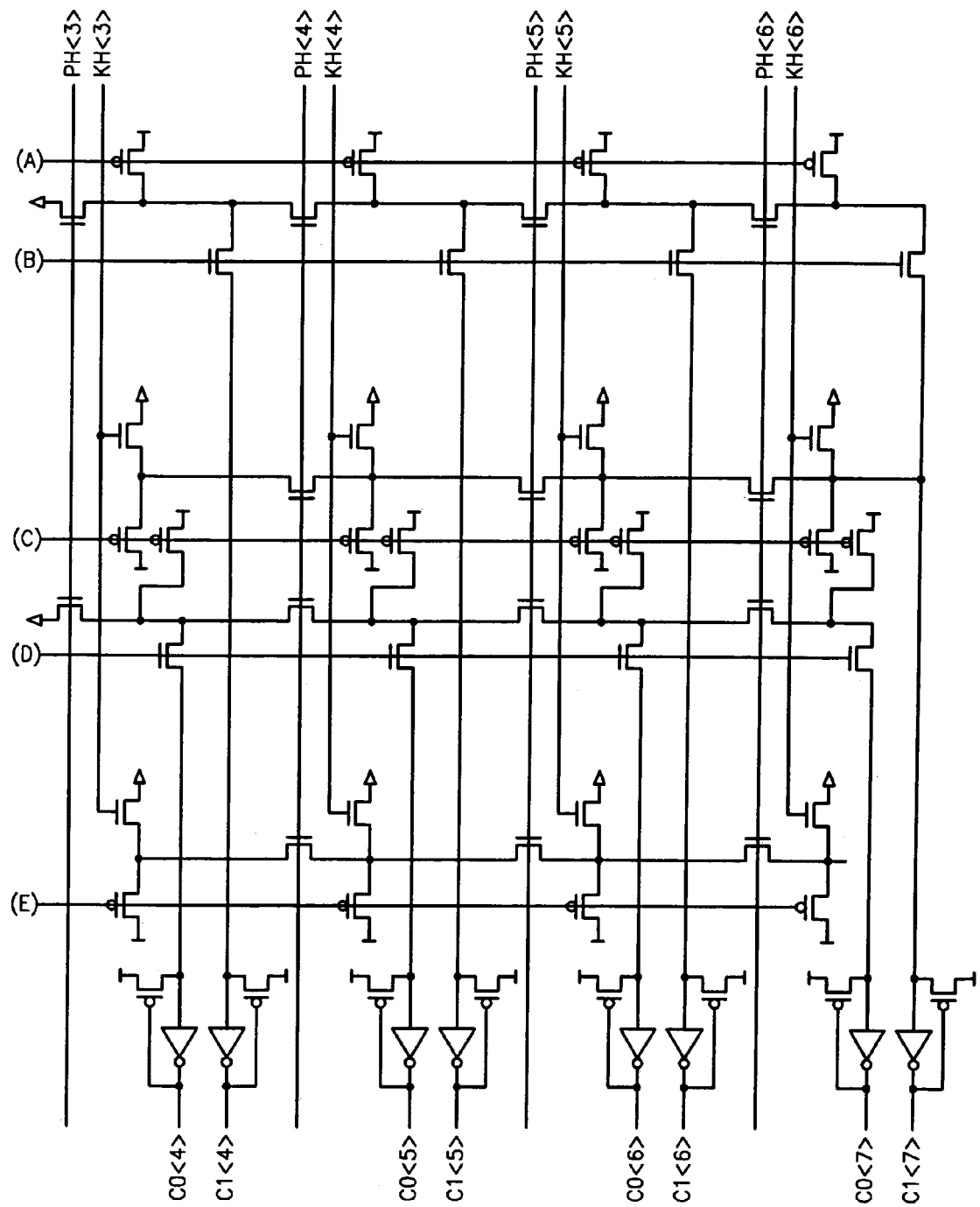

FIGS. 5A and 5B show a circuit diagram of an example implementation of bit carry unit 130 of FIG. 1, according to an embodiment of the present invention. Reference indications (A), (B), (C), (D), and (E) of FIG. 5A are connected to reference indications (A), (B), (C), (D), and (E) of FIG. 5B, respectively. FIGS. 5A and 5B together represent a Manchester carry chain type of circuit. Referring to FIGS. 5A and 5B, when clock signal ACLK signaling the start of the summation is activated, bit carry unit 130 receives carry propagation bit values PH and carry kill bit values KH and then determines bit carry signals C0 and C1. It is noted that for simplicity of depiction, FIGS. 5A-5B show only bits C0<7:0> and C1<0:7> among all of the bits C0<i> and C1<i>.

In Manchester carry chain of FIGS. 5A and 5B, C1<i> indicates an $i^{th}$ bit of carry signal and is formed according to C1 Equation 6. As such, the fifth logic combination is performed on carry propagation bit value PH and carry kill bit value KH, for the case where the block carry exists. C0<i> indicates an $i^{th}$ bit of carry signal C0 and is formed according to Equation 6. As such, the fifth logic combination is performed on carry propagation bit value PH and carry kill bit value KH for the case where there is no block carry.

Figure 6:
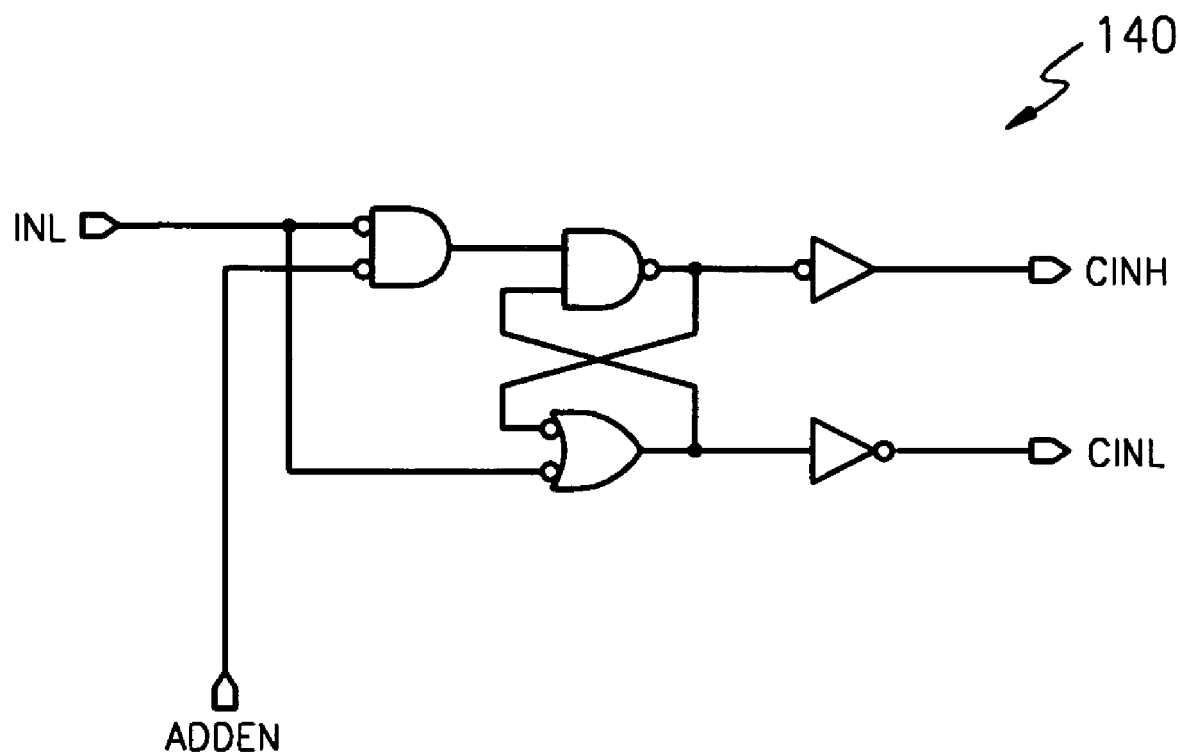
FIG. 6 is a circuit diagram of an example implementation of a control circuit 140 of FIG. 1, according to an embodiment of the present invention.

FIG. 6 is a circuit diagram of an example implementation of control circuit 140 of FIG. 1, according to an embodiment of the present invention. Referring to FIG. 6, control circuit 140 generates selection-control signals CINH and CINL based on a signal ADDEN and a signal INL. Signal ADDEN denotes an enable signal which enables the summation and transitions to the first logic state during the summation. Signal INL is set to the second logic state when clock signal ACLK is in an inactive state, e.g., in the first logic state. As such, while block carry selection unit might use various clocks at a transistor level, the formation of selection-control signals CINH and CINL is independent of (or, in other words, is not controlled at a logic level by) any clock signals, e.g., in the sense of not involving a clock as an enablement signal like what is done in the Background Art. An effect of producing selection-control signals CINH and CINL is that CLA 100 can be described as self-timed.

When block carry signals K0, K4, and K8 are in the first logic state and signal INL transitions to the first logic state, then selection-control signal CINH is set to the second logic state and selection-control signal CINL is set to the first logic state; accordingly, summation selection unit 150 selects bit carry signals C1 according to selection-control signals CINH and CINL. If signal INL transitions to the first logic state even when there are carries propagated from the lower bit blocks then selection-control signal CINH is set to the second logic state and selection-control signal CINL is set to the first logic state; accordingly summation selection unit 150 selects bit carry signals C1 according to selection-control signals CINH and CINL.

Similarly, when no block carry exists, e.g., one of block carry signals K0, K4, and K8 of each of the M blocks is in the second logic state, signal INL remains in the second logic state. If so, then selection-control signal CINH is set to the first logic state and selection-control signal CINL is set to the second logic state. Summation selection unit 150 selects bit carry signals C0 in the case where no carry exists in the first bit, according to selection-control signals CINH and CINL. Also, signal INL also remains in the second logic state when there are no carries propagated from the lower bit blocks; accordingly selection-control signal CINH is set to the first logic state and selection-control signal CINL is set to the second logic state.

In CLA 100, summation selection unit 150 synchronizes with selection-control signals CINH and CINL and outputs signal SUM within the one phase of clock signal ACLK as soon as block carry signals K0, K4, and K8 are generated. In contrast, the Background Art CLA, clock signal ACLK is activated and then sense amplifier F/F is enabled/driven (via a clock signal) only after a delay of one phase is imposed beyond the time at which clock signal ACLK is activated, such delay providing a time margin in which generation of the block carry signals K0, K4, and K8 has a high probability of completion. As a result, in the Background Art CLA, an adder bar clock of clock signal ACLK (the inverted version of signal ACLK) is applied to the sense amplifier F/F, and thus the final summation signal is delayed by one phase are output. Accordingly, block carry selection unit 150 of CLA 100 makes a high-speed summation possible.

Figure 7:
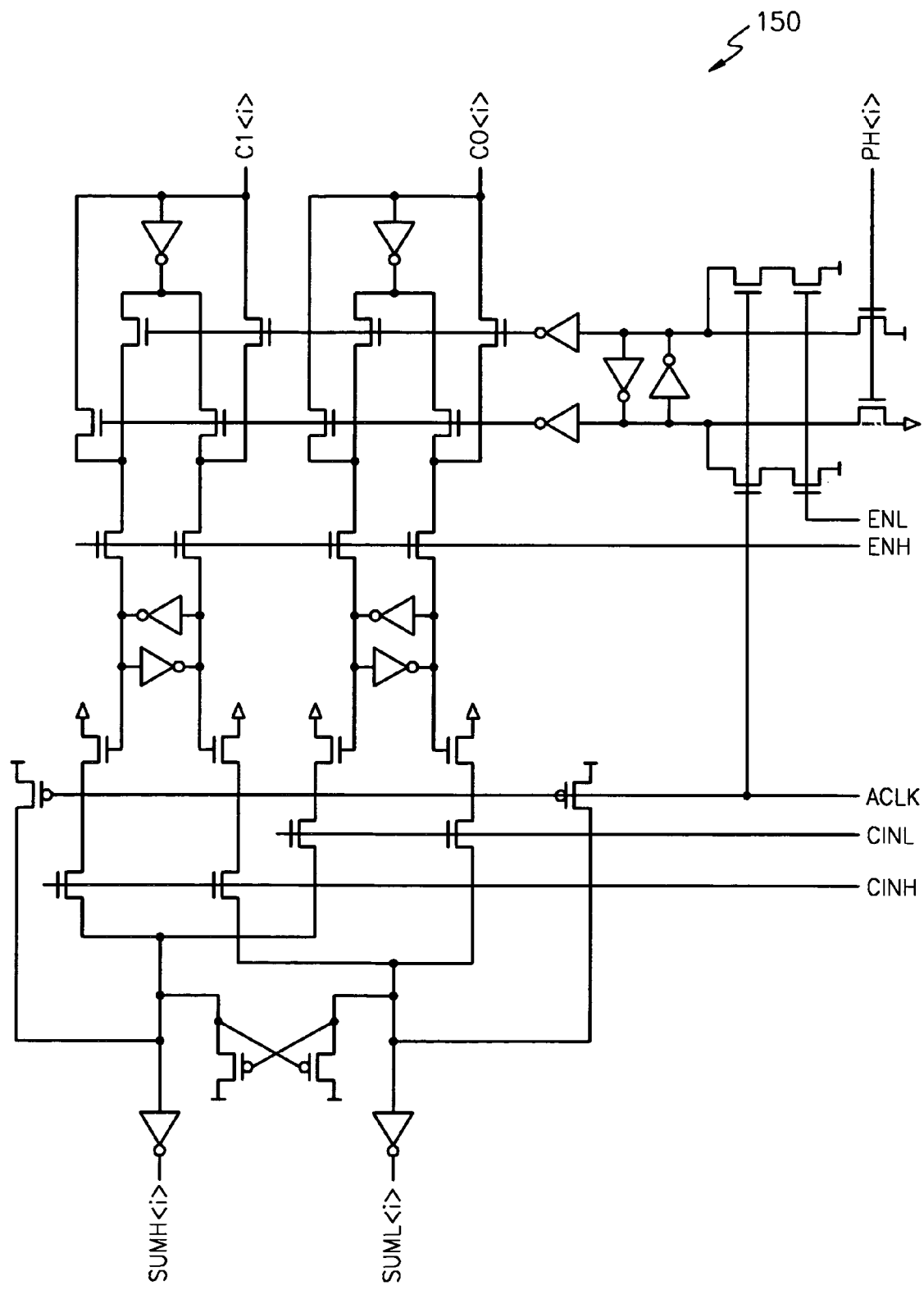
FIG. 7 is a circuit diagram of an example implementation of a summation selection unit 150 of FIG. 1, according to an embodiment of the present invention.

FIG. 7 is a circuit diagram of an example implementation of summation selection unit 150 of FIG. 1, according to an embodiment of the present invention. Referring to FIG. 7, when clock signal ACLK signaling the start of the summation is activated and enable signals ENH and ENL transit to the second logic state and the first logic state, respectively, then summation selection unit 150 does the following: selects bit carry signals C0 or C1 according to selection-control signals CINH and CINL; adds carry propagation bit values PH to the selected bit carry signals (signals C0 or signals C1); and outputs final sum results signals SUMH<i> and SUML<i>, which are logical complements of each other and which include the final carry CM. Here, the summation is formed by performing XOR logic operations on the selected bit carry signals (signals C0 or signals C1) and on bit carry propagation bit values PH, respectively, as in Table 2.

Figure 8:
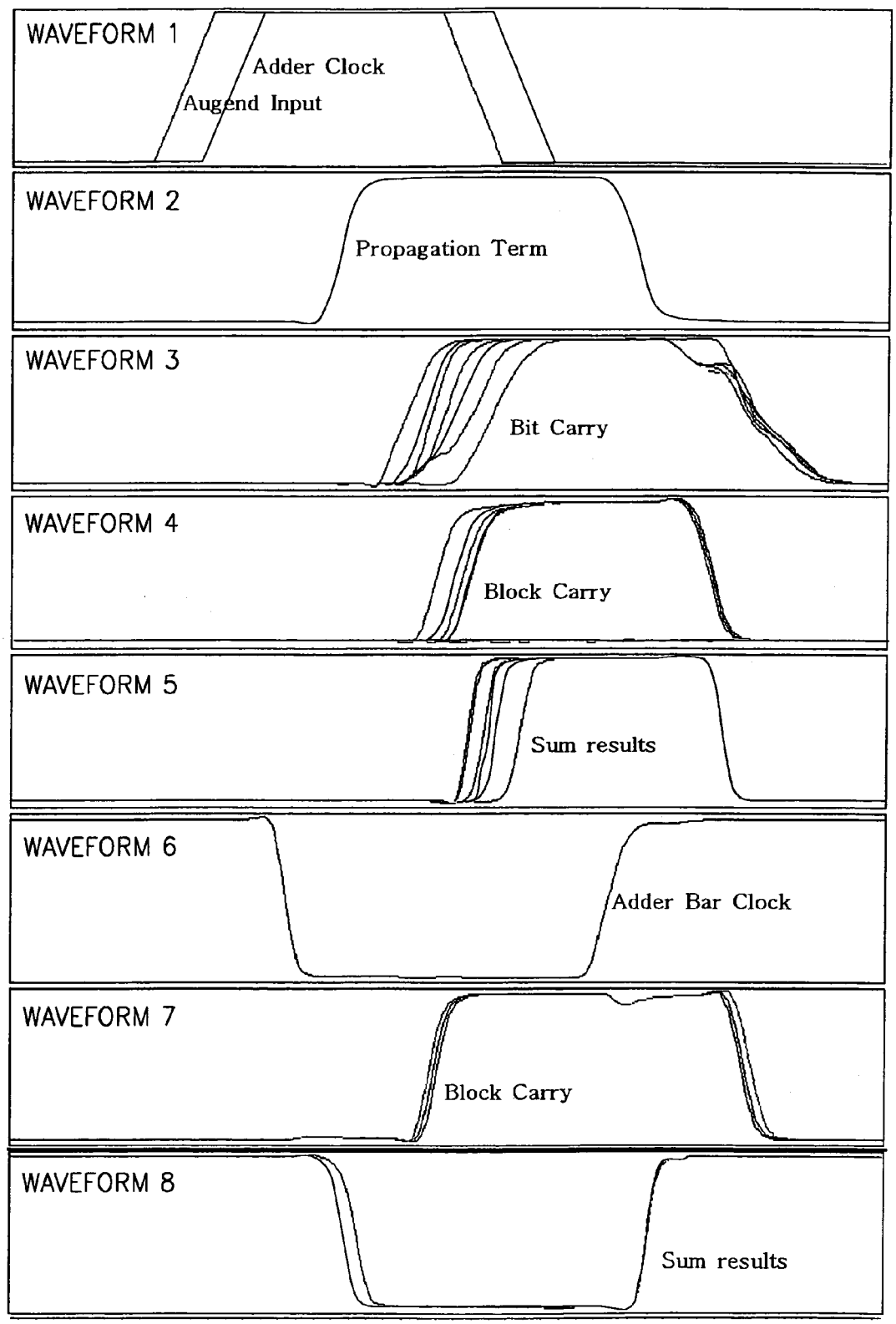
FIG. 8 is a view comparing waveforms obtained by simulating an example implementation of the CLA of FIG. 1 with waveforms obtained by simulating the Background Art CLA, according to the Background Art.

FIG. 8 is a view waveforms obtained by simulating an example implementation of CLA 100 as contrasted with waveforms obtained by simulating the Background Art CLA. More particularly, waveforms 1 through 5 were obtained by simulating CLA 100 into which the example circuits of FIGS. 3 through 7 are integrated, and waveforms 6 through 8 were obtained by simulating the Background Art CLA.

As can be seen in FIG. 8, waveform 1 shows an augend input time when addend A and augend B are input and an adder clock time when clock signal ACLK signaling the start of the summation transitions to an active state. Enable signal ADDEN of FIG. 6 is generated by inverting clock signal ACLK. Waveform 2 shows a propagation term for which carry propagation bit value PH transitions to the second logic state, e.g., such as when a bit value of addend A is "0" and a bit value of augend B is "1". Waveform 3 shows the bit carries generated by bit carry unit 130. Here, delays of the upper bits calculated by bit carry unit 130 increase. Waveform 4 shows that block carry signals K0, K4, and K8 are selected and output. Waveform 5 shows the final sum results calculated as soon as block carry signals K0, K4, and K8 are generated.

Waveform 6 shows the adder bar clock of clock signal ACLK which is applied to the Background Art sense amplifier F/F so that the sense amplifier F/F is driven/enabled (via a clock signal) only after expiration of one phase after clock signal ACLK is activated. Waveform 7 shows block carry signals K0, K4, and K8 generated in the Background Art CLA. Waveform 8 shows points in time when the final sum results are calculated in the Background Art CLA.

As shown in FIG. 8, the sum results output from CLA 100 are one phase advanced relative to the sum results output from the Background Art CLA. In other words, CLA 100 outputs the final sum results as soon as block carry unit 120 generates block carry signals K0, K4, and K8.

In summary, in CLA 100, carry generation/propagation unit 110 divides each of addend A and augend B input as N-bit binary values into M blocks and performs the first logic combination on each bit of the M blocks of addend A and each bit of the M blocks of augend B to calculate carry propagation bit values PH and carry kill bit values KH. Block carry unit 120 generates block carry signals K0, K4, and K8. Bit carry unit 130, which is realized as a Manchester carry chain calculates bit carry signals C0 and bit carry signals C1 for the case where the block carry exists in each of the M blocks and the case where no carry exists in the first bit of each of the M blocks, respectively.

When control circuit 140 generates selection-control signals CINH and CINL, summation selection unit 150 synchronizes with selection-control signals CINH and CINL, selects bit carry signals C0 or signals C1 corresponding to selection-control signals CINH and CINL, adds carry propagation bit values PH to the selected bit carry signals (signals C0 or signals C1), and outputs final sum result signal SUM including final carry signal CM.

As described above, a CLA according to embodiments of the present invention can use Manchester carry chains and include a synchronizer which calculates final summation values from bit carries selected by block carry signals as soon as the block carry signals are generated and propagated. Thus, since loss of time due to waiting an enabling clock signal to activate a sense amplifier F/F (which is needed according to the Background Art) can be reduced, an addend and an augend can be summed within one phase of a clock signal at a high speed.

While the present invention has been particularly shown and described with reference to example embodiments thereof, it will be understood by those of ordinary skill in the art that various changes in form and details may be made therein without departing from the spirit and scope of the present invention

What is claimed is:

1. A carry look-ahead adder comprising:
   a carry generation circuit, organized into M blocks, arranged to perform first logic combinations on an N-bit addend and an N-bit augend, which results in carry propagation bit values and carry kill bit values, respectively, where M and N are positive integers and M<N;
   a block carry circuit arranged to perform second logic combinations on the carry kill bit values, and to perform third logic operations and fourth logic operations on the propagation bit values and the carry kill values,
      the second logic combination producing at least one first-type block carry signal that transitions logic states when one or more of the carry kill bit values are in a second logic state relative to a first logic state,
      the third logic combination producing at least one second-type block carry signal that transitions logic states when one or more of the carry kill bit values for the lower N/(2M) bits is in the second logic state, and
      the fourth logic combination producing at least one third-type block carry signal that transitions logic states when one or more of the carry kill bit values for the upper N/(2M) bits is in the second logic state;
   a bit carry circuit, having a Manchester carry chain configuration, to perform a fifth logic combination on the carry propagation bit values and the carry kill bit values which results in first bit carry signals for a case where a block carry exists in each of the M blocks and results in second carry bit signals for a case where no block carry exists;
   a control circuit to generate selection-control signals based upon the block carry signals, generation of the selection-control signals not logically being controlled by clock signals; and
   a summation selection circuit to select between the first bit carry signals and the second bit carry signals, to add the carry propagation bit values and the selected carry signals and accordingly to output a final sum result.

2. The carry look-ahead adder of claim 1, wherein the summation selection circuit is operable to select the first bit carry signals when the block carry signals are all in the first logic state.

3. The carry look-ahead adder of claim 2, wherein the summation selection circuit is operable to select the first carry bit signals when lower bit blocks propagate carries.

4. The carry look-ahead adder of claim 3, wherein the lower bit blocks include a first previous block located immediately lower from block in which the summation is performed and a second previous block located immediately lower from the first previous block.

5. The carry look-ahead adder of claim 1, wherein the carry generation circuit includes XOR logic to produce the carry propagation bit values and NOR logic to produce the carry kill bit values.

6. The carry look-ahead adder of claim 1, wherein the block carry circuit includes OR logic operable upon all of the carry kill bit values.

7. The carry look-ahead adder of claim 1, wherein the third logic combination satisfies the following Logic Equation:

$$K4 = PH\langle\{(N/M)-1\}\rangle PH\langle\{(N/M)-2\}\rangle \ldots PH\langle\{N/(2M)+1\}\rangle PH\langle N/(2M)\rangle \{KH\langle\{N/(2M)-1\}\rangle + PH\langle\{N/(2M)-1\}\rangle KH\langle\{N/(2M)-2\}\rangle + PH\langle\{N/(2M)-1\}\rangle PH\langle\{N/(2M)-2\}\rangle KH\langle\{N/(2M)-3\}\rangle + \ldots + PH\langle\{N/(2M)-1\}\rangle PH\langle\{N/(2M)-2\}\rangle \ldots PH\langle 1\rangle KH\langle 0\rangle + PH\langle\{N/(2M)-1\}\rangle PH\langle\{N/(2M)-2\}\rangle \ldots PH\langle 1\rangle PH\langle 0\rangle\}$$

wherein K4 is the second-type block carry signal, KH<i> is a carry kill bit value, and PH<i> is a carry propagation bit value.

8. The carry look-ahead adder of claim 1, wherein the fourth logic combination satisfies the following Logic Equation:

$$K8 = KH\langle\{(N/M)-1\}\rangle + PH\langle\{(N/M)-1\}\rangle KH\langle\{(N/M)-2\}\rangle + \ldots + PH\langle\{(N/M)-1\}\rangle PH\langle\{(N/M)-2\}\rangle \ldots PH\langle\{(N/(2M)+2\}\rangle KH\langle\{N/(2M)+1\}\rangle + PH\langle\{(N/M)-1\}\rangle PH\langle\{(N/M)-2\}\rangle \quad . \quad . \quad . \\ PH\langle\{(N/(2M)+1)\}\rangle KH\langle N/(2M)\rangle$$

wherein K8 is the third-type block carry signal, KH<i> is a carry kill bit value, and PH<i> is a carry propagation bit value.

9. The carry look-ahead adder of claim 1, wherein the fifth logic combination satisfies Logic Equation below:

$$C0\langle i\rangle = KH\langle i-1\rangle + PH\langle i-1\rangle C0\langle i-1\rangle \quad C1\langle i\rangle = KH\langle i-1\rangle + PH\langle i-1\rangle C1\langle i-1\rangle$$

wherein i denotes integers from 0 to (N/M−1), C1<i> denotes an ith bit of the second bit carry signals, C0<i> denotes an ith bit of the first bit carry signals, and PH<> denotes the carry propagation bit value, and KH<> denotes the carry kill bit value.

10. The carry look-ahead adder of claim 1, wherein the summation circuit includes XOR logic operable upon the selected bit carry signals and the carry propagation bit values, respectively.

11. A summation method for carry look-ahead addition performed by a carry look-ahead adder, comprising:
   organizing an N-bit addend and an N-bit augend into M blocks, where N and M are positive integers and N>M;
   performing first logic combinations the addend and the augend resulting in carry propagation bit values and carry kill bit values;
   performing second logic combinations on the carry kill bit values resulting in at least one first-type block carry signal that transitions logic states when one or more of the carry kill bit values are in a second logic state relative to a first logic state;
   performing third logic operations resulting in at least one second-type block carry signal that transitions logic states when one or more of the carry kill bit values for the lower N/(2M) bits is in the second logic state, and
   performing fourth logic operations on the propagation bit values and the carry kill values resulting in at least one third-type block carry signal that transitions logic states when one or more of the carry kill bit values for the upper N/(2M) bits is in the second logic state;
   using Manchester carry chains to perform a fifth logic combination on the carry propagation bit values and the carry kill bit values resulting in first bit carry signals for a case where a block carry exists in each of the M blocks and results in second bit carry signals for a case where no block carry exists;
   generating, independently of a clock enable signal at a logical level, selection-control signals based upon the block carry signals; and
   selecting between the first bit carry signals and the second bit carry signals;
   adding the carry propagation bit values and the selected carry signals resulting in a final sum result; and
   outputting the final sum result.

12. The summation method of claim 11, wherein the selected bit carry signals are the first bit carry signals when the block carry signals are all in the first logic state.

13. The summation method of claim 12, wherein the selected bit carry signals are the first bit carry signals when lower bit blocks propagate carries.

14. The summation method of claim 13, wherein the lower bit blocks include a first previous block located immediately lower from block in which the summation is performed and a second previous block located immediately lower from the first previous block.

15. The summation method of claim 11, wherein the performing of the first logic combination includes applying an XOR logic operation bitwise on the addend and the augend to produce the carry propagation bit values and applying a NOR logic operation bitwise on the addend and the augend to produce the carry kill bit values.

16. The summation method of claim 11, wherein the performing of the second logic combination includes applying OR logic to all of the carry kill bit values.

17. The summation method of claim 11, wherein the third logic combination satisfies the following Logic Equation:

$$K4=PH<\{(N/M)-1\}>PH<\{(N/M)-2>\ldots PH<\{N/(2M)+1\}>PH<N/(2M)>\{KH<\{N/(2M)-1\}>+PH<\{N/(2M)-1\}>KH<\{N/(2M)-2\}>+PH<\{N/(2M)-1\}>PH<\{N/(2M)-2\}>KH<\{N/(2M)-3\}>+\ldots+PH<\{N/(2M)-1\}>PH<\{N/(2M)-2\}> \quad . \quad . \quad . \quad PH<1>KH<0>+PH<\{N/(2M)-1\}>PH<\{N/(2M)-2\}>\ldots PH<1>KH<0>\}$$

wherein K4 is the second-type block carry signal, KH<i> is a carry kill bit value, and PH<i> is a carry propagation bit value.

18. The summation method of claim 11, wherein the fourth logic combination satisfies Logic Equation below:

$$K8=KH<\{(N/M)-1\}>+PH<\{(N/M)-1\}>KH<\{(N/M)-2\}>+\ldots+PH<\{(N/M)-1\}>PH<\{(N/M)-2\}>\ldots PH<\{(N/(2M)+2)\}>KH<\{N/(2M)+1\}>+PH<\{(N/M)-1\}>PH<\{(N/M)-2\}>\ldots PH<\{(N/(2M)+1)\}>KH<N/(2M)>$$

wherein K8 is the third-type block carry signal, KH<i> is a carry kill bit value, and PH<i> is a carry propagation bit value.

19. The summation method of claim 11, wherein the fifth logic combination satisfies the following Logic Equation:

$$C0<i>=KH<i-1>+PH<i-1>C0<i-1>C1<i>=KH<i-1>+PH<i-1>C1<i-1>$$

wherein i denotes integers from 0 to (N/M−1), C1<i> denotes an ith bit of the second bit carry signals, C0<i> denotes an ith bit of the first bit carry signals, and PH<> denotes the carry propagation bit value, and KH<> denotes the carry kill bit value.

20. The summation method of claim 11, wherein the adding includes performing an XOR logic operation on the selected bit carries and the carry propagation bit values, respectively.

21. A carry look-ahead adder, comprising:
a carry generation circuit, organized into M blocks, arranged to perform first logic combinations on an N-bit addend and an N-bit augend, which results in carry propagation bit values and carry kill bit values, respectively, where M and N are positive integers and M<N;
a block carry circuit arranged to perform second logic combinations on the carry kill bit values, and to perform third logic operations and fourth logic operations on the propagation bit values and the carry kill values,
the second logic combination producing at least one first-type block carry signal that transitions logic states when one or more of the carry kill bit values are in a second logic state relative to a first logic state,
the third logic combination producing at least one second-type block carry signal that transitions logic states when one or more of the carry kill bit values for the lower N/(2M) bits is in the second logic state, and
the fourth logic combination producing at least one third-type block carry signal that transitions logic states when one or more of the carry kill bit values for the upper N/(2M) bits is in the second logic state,
wherein the block carry circuit is configured to output the first-type block carry signal, the second-type block carry signal, and the third-type block carry signal.

22. The carry look-ahead adder of claim 21, further comprising:
a bit carry circuit, having a Manchester carry chain configuration, to perform a fifth logic combination on the carry propagation bit values and the carry kill bit values which results in first bit carry signals for a case where a block carry exists in each of the M blocks and results in second carry bit signals for a case where no block carry exists;
a control circuit to generate selection-control signals based upon the block carry signals, generation of the selection-control signals not logically being controlled by clock signals; and
a summation selection circuit to select between the first bit carry signals and the second bit carry signals, to add the carry propagation bit values and the selected carry signals and accordingly to output a final sum result.

23. A summation method for carry look-ahead addition performed by a carry look-ahead adder, comprising:
organizing an N-bit addend and an N-bit augend into M blocks, where N and M are positive integers and N>M;
performing first logic combinations the addend and the augend resulting in carry propagation bit values and carry kill bit values;
performing second logic combinations on the carry kill bit values resulting in at least one first-type block carry signal that transitions logic states when one or more of the carry kill bit values are in a second logic state relative to a first logic state;
performing third logic operations resulting in at least one second-type block carry signal that transitions logic states when one or more of the carry kill bit values for the lower N/(2M) bits is in the second logic state,
performing fourth logic operations on the propagation bit values and the carry kill values resulting in at least one third-type block carry signal that transitions logic states when one or more of the carry kill bit values for the upper N/(2M) bits is in the second logic state, and
outputting the carry propagation bit values, the carry kill bit values, the first-type block carry signal, the second-type block carry signal, and the third-type block carry signal.

24. The method of claim 23, further comprising:
using Manchester carry chains to perform a fifth logic combination on the carry propagation bit values and the carry kill bit values resulting in first bit carry signals for a case where a block carry exists in each of the M blocks and results in second bit carry signals for a case where no block carry exists;

generating, independently of a clock enable signal at a logical level, selection-control signals based upon the block carry signals; and selecting between the first bit carry signals and the second bit carry signals;

adding the carry propagation bit values and the selected carry signals resulting in the final sum result; and outputting the final sum result.

* * * * *